United States Patent [19]

Marlin et al.

[11] Patent Number: 5,546,577
[45] Date of Patent: Aug. 13, 1996

[54] UTILIZING INSTRUMENTED COMPONENTS TO OBTAIN DATA IN A DESKTOP MANAGEMENT INTERFACE SYSTEM

[75] Inventors: James W. Marlin, Longmont; Raymond L. Knudson; Thomas M. Ruehle, both of Boulder; Anthony F. Stuart, Jamestown; Edward T. Hughes, III, Arvada, all of Colo.

[73] Assignee: International Business Machines Corporation, Armonk, N.Y.

[21] Appl. No.: 334,592

[22] Filed: Nov. 4, 1994

[51] Int. Cl.$^6$ .......................... G06F 17/00; G06F 19/00
[52] U.S. Cl. .................. 395/600; 395/903; 395/800; 364/221.9; 364/DIG. 1
[58] Field of Search ................................. 395/600, 200, 395/275, 575

[56] References Cited

U.S. PATENT DOCUMENTS

| | | | |
|---|---|---|---|
| 4,251,858 | 2/1981 | Cambigue et al. | 395/200 |
| 4,495,572 | 1/1985 | Bosen | 364/200 |
| 4,862,345 | 4/1989 | Lekron | 364/188 |
| 4,933,967 | 6/1990 | Lo et al. | 379/207 |
| 4,941,091 | 7/1990 | Breault et al. | 364/406 |
| 4,969,093 | 11/1990 | Barker et al. | 364/900 |
| 5,008,827 | 4/1991 | Sansome et al. | 364/464.02 |
| 5,077,694 | 12/1991 | Sansone et al. | 395/500 |
| 5,157,783 | 10/1992 | Anderson et al. | 395/600 |
| 5,220,674 | 6/1993 | Morgan et al. | 395/800 |
| 5,261,098 | 11/1993 | Katin et al. | 395/650 |
| 5,291,602 | 3/1994 | Barker et al. | 395/700 |
| 5,381,470 | 1/1995 | Cambray et al. | 379/216 |
| 5,398,336 | 3/1995 | Tantry et al. | 395/600 |
| 5,406,322 | 4/1995 | Port et al. | 348/15 |
| 5,423,003 | 6/1995 | Berteau | 395/200 |

OTHER PUBLICATIONS

Steven Moore, "IBM pledges desktop interface support.,"; Computerword, vol. 28, Issue 44, Oct. 31, 1994.
David Buerger, "Back to reality", Network World, vol. 11, Issue 42, Oct. 17, 1994.
Skip McAskill, "DMTF finalizies desktop management specification.", Network Word, vol. 11, Issue, 17 Apr. 25, 1994.
Shannoon Gray–Voigt; "Bringing standard management to desktop computing."; Network Word, vol. 11, Issue 44, Oct. 31, 1994.
Patent application Ser. No. 08/034,068, filed Mar. 22, 1993, "Method for Reducing SNMP Instrumentation Message Flows," McKenzie et al.
Patent application Ser. No. 08/618.113, filed Dec. 15, 1993, "System and Method for Collecting and Retrieving Problem Determination Data," McKenzie et al.

Primary Examiner—Thomas G. Black
Assistant Examiner—C. Pham
Attorney, Agent, or Firm—Charles E. Rohrer

[57] ABSTRACT

Instrumentation logic is provided to map object oriented protocols to efficient data management protocols to provide direct, keyed access to multiple data entries. An object oriented database is utilized to model a complex process since it is easily extended to include tables of transactions for each of the many process steps in a complex operation. The database is accessed through the Desktop Management Interface (DMI) with individual DMI commands issued to get or set each individual entry. An application requiring access to many entries would require detailed knowledge of the database and would need to generate many DMI commands. For such an application, instrumentation logic is provided and is accessed by the application through a normal DMI command. The instrumentation then generates all of the successive DMI commands needed to access multiple entries. The invention is extended by utilizing an additional database management system such as DB2 which provide efficient query/response access to large databases. In such case, the invoked instrumentation logic issues a query to obtain the requested data. In both cases, the instrumentation returns the data utilizing the normal DMI interface.

9 Claims, 6 Drawing Sheets

UTILIZING INSTRUMENTED COMPONENTS TO OBTAIN DATA IN A DESKTOP MANAGEMENT INTERFACE SYSTEM

This invention relates to the automated management of a complex environment and more particularly to the efficient retrieval of data spread throughout a large object-oriented database.

CROSS REFERENCE TO THE RELATED APPLICATIONS

Several patent applications filed concurrently herewith relate to the invention herein. They are patent application Ser. No. 08/334,810 entitled, "Table Driven Graphical user interface"; patent application Ser. No. 08/334,584 entitled "Desktop Management of Host Applications"; and patent application Ser. No. 08/334,948 entitled "client Network Interface".

BACKGROUND OF THE INVENTION

The desire to develop control technologies in order to produce end-products more efficiently, or more cheaply, or of higher quality has existed for many years. Machines utilizing mechanical controls, hydraulic controls, or pneumatic controls were developed in the eighteenth century. With the advent of electrical technology, the increased ability to control the movement of work pieces from one work station to another down conveyor lines enabled a significant advance in the cost, efficiency and quality objectives of control technology. With the development of computers, particularly general purpose computers, control technology became much more flexible. Improvements in the control of a process could be effected by changes in software, as opposed to changes in hardware which were necessary on the earlier systems. Also, computer technology brought about the ability to automate processes not previously subject to machine control. For example, accounting work that was previously done by hand with the aid of simple adding machines or other calculating devices of that sort were automated by computerized systems to produce end-products in a much more efficient and less costly manner. The preparation of documents has been automated to some extent by the use of word processors. Generally speaking, computers have enabled the automation of information processes much the same as in an earlier day the electrical technology enabled the automatic movement of work pieces down a conveyor line.

The continued development of semi-conductor technology has enabled enormous computing capacity in very small computing elements. As a result, microprocessors have found use within machinery as control elements, replacing cams and gears and relays and other such devices of the previous control technologies. As a result the flexibility of programmed microprocessor is now available in many types of equipment. With microprocessor control of machines so pervasive, there occurs the need that various types of equipment in a work process be tied together and report to various processors which can manage the overall operation. Management may occur at the process level, i.e., to send a work piece from one work station to another and perform the operations called for, and it can occur on an information level as well, i. e., for example, processes can acquire information about machines so that they can be maintained prior to a breakdown, processes can schedule jobs, maintain inventories and automatically perform other accounting functions.

The particular complex environment in which the current invention was developed is the large mail room operation. In such an operation a variety of documents must be printed, fed along conveyor lines for correlation with other documents to comprise the particular mailing, through devices which may trim the documents, fold them, place them in envelopes and place them on trays. The envelopes will have a printed address so that a weighing mechanism may determine the postage that is needed and place the postage on the envelope. There are machines to sort mail according to zip codes and by walk sequence, i.e., the sequence that a mail carrier will follow delivering mail along a particular route. Finally, the outputs may be boxed according to the location to which they are sent and delivery automatically ordered for the next airplane leaving for that location.

In the large mailroom, information about recipients might be included in a database. For example, certain mailings may go to those people who are known to enjoy golf and other mailings may go to people who are in the dental profession. Some mail room operators may wish to track the effectiveness of marketing promotions. For example, people in a certain area might be targeted to receive a discount on an item and coupons for those people would receive a certain bar code. Another area might receive a different discount and have a different bar code. Later, once the coupons are returned, data relating the amount of interest developed by the promotion can be accumulated by reading the bar codes and automatically producing the reports.

As may be observed from the above description the amount of data which is organized in large mail room operations is enormous. It is not unusual for these operations to include banks of computers, banks of data storage equipment, various types of printers from many different manufacturers and complex inserting equipment capable of merging documents from several paths into one stack, folding, cutting, inserting, franking, sorting, and packaging.

In the current environment marks may be placed on the paper in a certain location so that scanning those marks can trigger the correct operation to direct that particular paper along its route to its destination in the proper envelope. Such marks can be on each page of a document or they can be on header pages. Such marks might require the trimming of a document before it is actually sent out to a customer.

Figure 1:
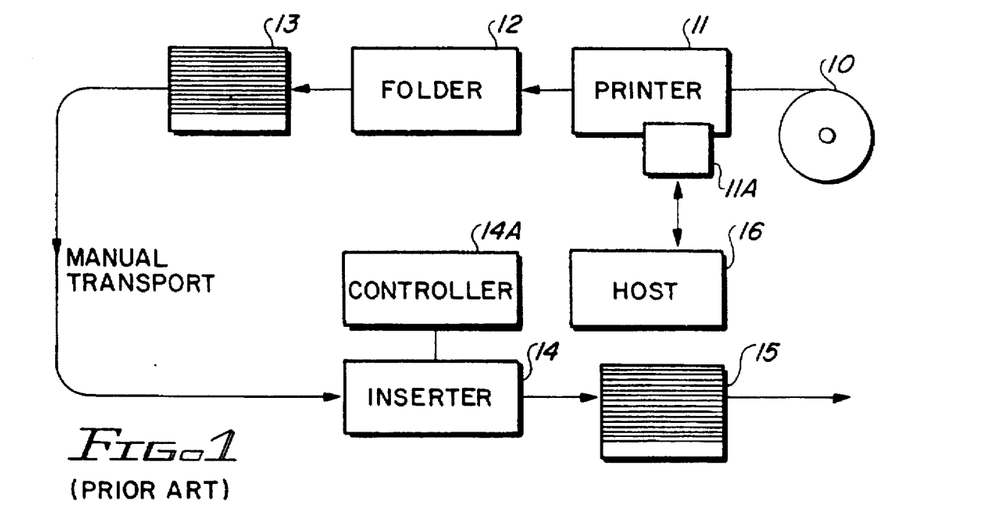
FIG. 1 shows a simplified configuration of a large mailroom system with a printer line for document preparation separate from an inserter line for accumulating documents in an envelope.

FIG. 1 shows a simplified configuration that is utilized at the current time in print mail room facilities. The print job originates with application processes on a host 16 which is typically a large mainframe computer, making use of database facilities attached to the host. The generated print stream is converted into a device specific data stream and sent to the controller 11A of printer 11 for production of documents. An unwinder mechanism 10 is used to unwind rolls of paper and feed the paper into the printer 11. The printer output is passed to a folding machine 12 and organized on trays 13. The tray 13 is moved manually to provide input to a second line of machinery which may include devices to cut and trim the stacks of paper into individual documents and feed the documents through an inserting machine 14. Inserting machines are complex devices under the control of a microprocessor based controller 14A. The inserter may also receive documents from other document feeding devices and envelopes from another printing source for inserting the proper group of documents into a properly addressed envelope. The envelope may then pass through a franking machine and through sorting apparatus before being placed on trays 15 from which the properly sorted mail is packaged and sent off to the Post Office. An important advantage of the configuration as shown in FIG. 1 is that the printer line is separated from the inserter line of machinery. As a consequence the problems of matching the speed of these two lines is eliminated and printers are not held up by the operations of the inserters or vice versa. Such a configuration also makes the printer available for non-mail jobs. One of the important disadvantages is that marks are needed on each document or at least on header papers to correctly move the job through the equipment and into the proper envelope.

Figure 2:
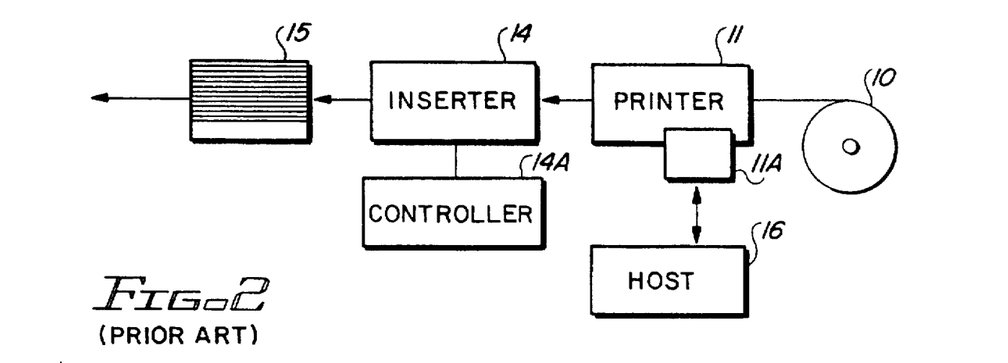
FIG. 2 shows a large mailroom system configuration with the printer line coupled directly to the equipment in the inserter line.

FIG. 2 shows a coupled configuration which is also in use at the current time. Again, the print job originates in the host 16 and in its large database and the print stream is sent to the controller 11A of printer 11. In this configuration an unwinder mechanism 10 unwinds a roll of paper for feeding to a printer 11, the output of which is directly coupled to the inserter line 14. The advantages of this type of configuration is that a folding machine 12 in the printer line is eliminated. Only a single operator is needed and the output of the printer is packaged for immediate mailing. An important disadvantage is that the operations of the inserter and the printer must be speed matched. Also, in this configuration the printer is dedicated to mail applications and the system is only as reliable as its weakest link. Marks on the paper are still needed to coordinate the documents from a printer with envelopes fed into the inserter from a different document feeder.

Figure 3:
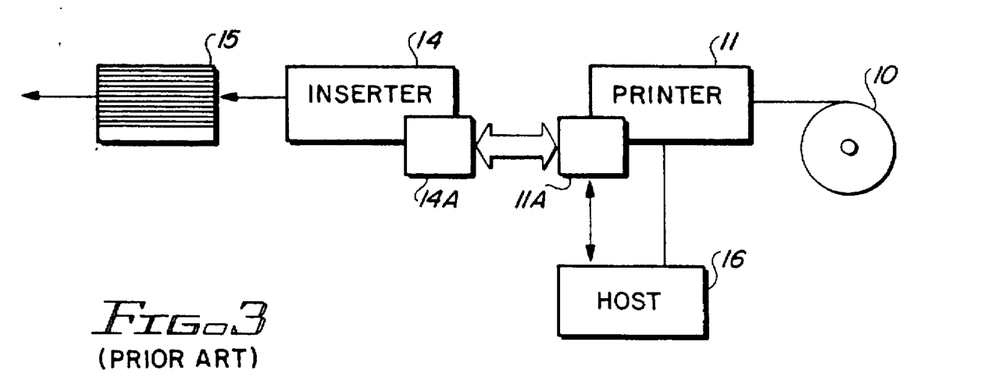
FIG. 3 illustrates a large mailroom system configuration wherein the controller of the printer is enabled to exchange information with the controller of the inserter.

FIG. 3 shows a system which may be termed an intelligently coupled configuration. This system is similar to the configuration shown in FIG. 2 except that the controller 11A for the printer and the controller 14A for the inserter are enabled to exchange information so that as documents are printed, the printer can inquire if the inserter is ready. If it is, then the printer can send the document on to the inserter. This system enables the printer to communicate with the host 16 that originates the print job and provide the host with information about the inserting equipment that is connected to the printer. As a consequence, the system is enabled to ascertain the capabilities present on the equipment in the print path. This system also enables processes running on the host to advise the printer and the other equipment in the path when a job begins and when a job ends so that the need for marks on the paper is diminished or completely eliminated. This system also provides an error recovery operation such that if a job is completed without incident that can be recorded. This system provides software control over the process but still retains certain disadvantages. For example, the speed between the printer and the inserter still must be matched. The entire line is only as reliable as its weakest link and the printer is dedicated to mail applications.

Figure 4:
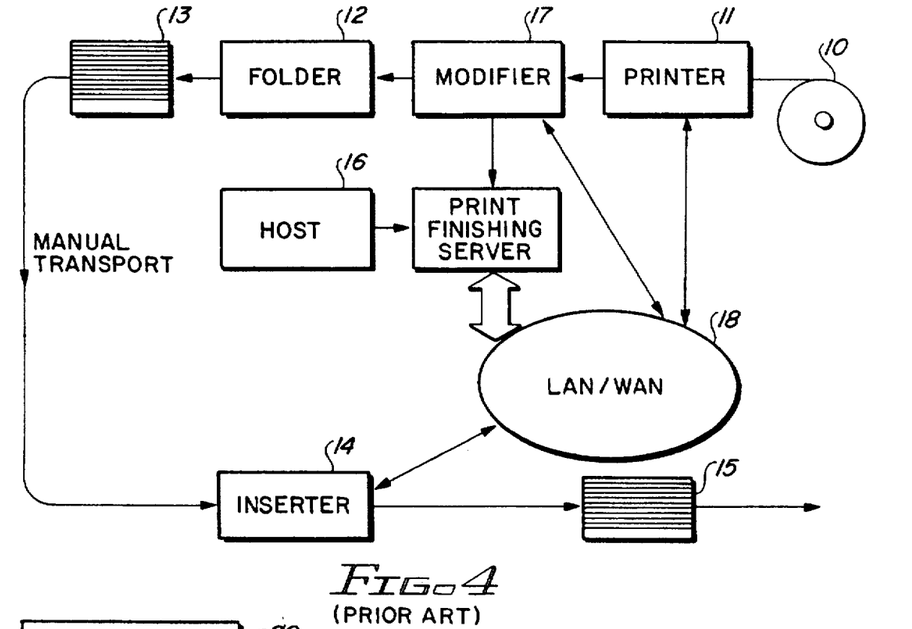
FIG. 4 shows a large mailroom system configuration wherein the output of the printer line is not directly coupled to the input of the inserter line, but the two lines are coupled over a network. The invention herein is designed for the network coupled configuration.

FIG. 4 shows a network coupled configuration for which this invention is designed. The print jobs originate with application processes at a host 16 for generating a print stream sent to the controller 11A of a printer 11 in much the same manner as the other configurations described above. In this system, FIG. 4 shows an unwinder mechanism 10 is used to unwind rolls of paper and send them to a printer 11. It should be noted that paper input to the printer could be from cut sheet document feeders, a continuous form feeder or any other type of paper feeder. The output of the printer 11 is sent to a medium modifier 17 which may be, for example, a mechanism to imprint a color plate on a medium, or make a perforation cut on a page to be returned by a recipient. From the medium modifier, the document path leads to a folder mechanism 12 for stacking the documents on a tray 13. In this configuration the printer line is separated from the inserter line. Consequently, there is a movement of the tray 13 to the input of the inserter line which is illustrated in FIG. 4 as a manual movement. In this configuration there is direct communication between the controller 14A in the inserter 14 with the system manager located on the network 18. Likewise, the system manager has direct communication with the controller 11A of printer 11 and perhaps with other devices in the system that have microprocessor based control. The communication may be either direct or through communication with the controller 11A in the printer or the controller 14A in the inserter. In that manner, error recovery procedures may be implemented throughout the system. The marks needed on paper are kept to a minimum. There still must be marks in order to identify jobs from the printer line when they reach the inserter. Speed matching is not a problem in this system since the printer line and the inserter line are separate and consequently the printer is available for non-mail jobs.

Figure 5:
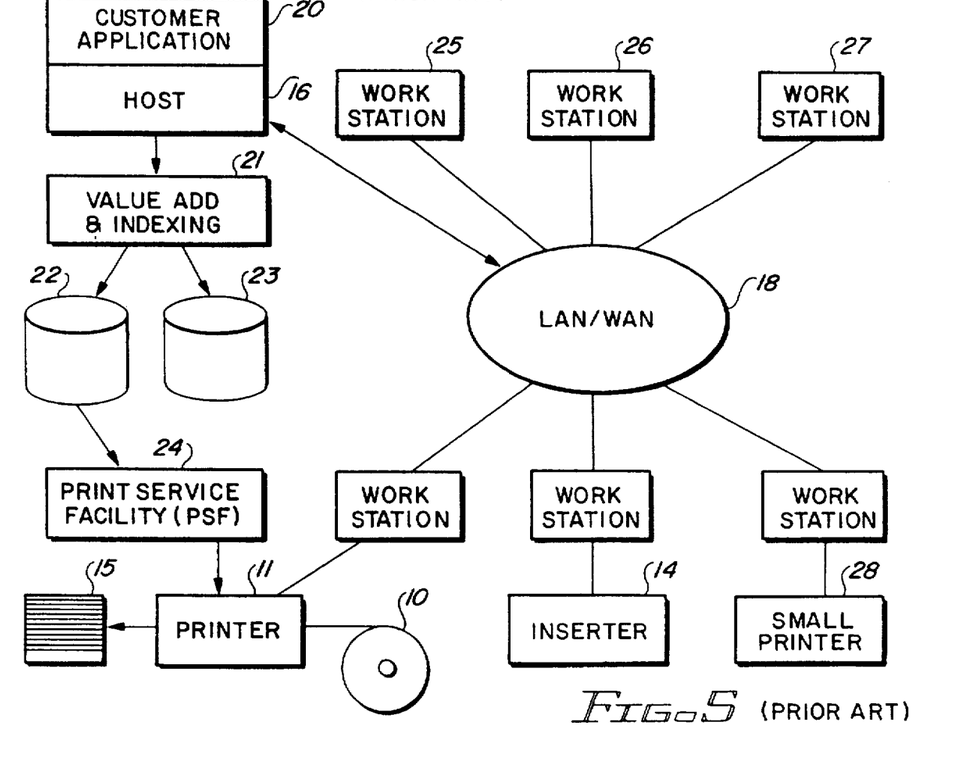
FIG. 5 shows a more complete depiction of the large mailroom network coupled system configuration of FIG. 4 and shows that a host or "mainframe" computer originating print jobs is coupled to the network together with many workstations which may be based upon desktop computers.

FIG. 5 is a more complete description of the system shown in FIG. 4 and shows that host 16 is connected into network 18. A customer application 20 is run on the host 16 to generate a print job. During that generation various value-add programs and indexing programs 21 may add to the print data stream and include data in the print files. Such programs may, for example, add bar codes for sorting files in zip sequence and generate the codes needed for proper finishing of the print job. Print files 22 and index files 23 may be created. Print Service Facility (PSF) 24 which also runs on host 16 will generate the print data stream for driving the printer 11. The system manager 25 resides on a work station which is connected into the network 18. The network may be either a local area network (LAN) or a wide area network (WAN). Also connected into the network are various work stations illustrated as graphical user interface (GUI) 26 and graphical user interface (GUI) 27 which may be placed in various locations for different purposes. For example, one may be at the inserter for the use of the operator of that line, one might be at the printer for the operator of that line, one might be at a warehouse for the warehouse manager to check the need for supplies as they are being used, e.g., paper, toner, etc.

In the system shown in FIG. 5, mutilated mail pieces are reprinted on demand on a smaller remote print station 28 attached to the network. In that manner, replacement documents are automatically generated as the system automatically senses the mutilation of a document.

Figure 6:
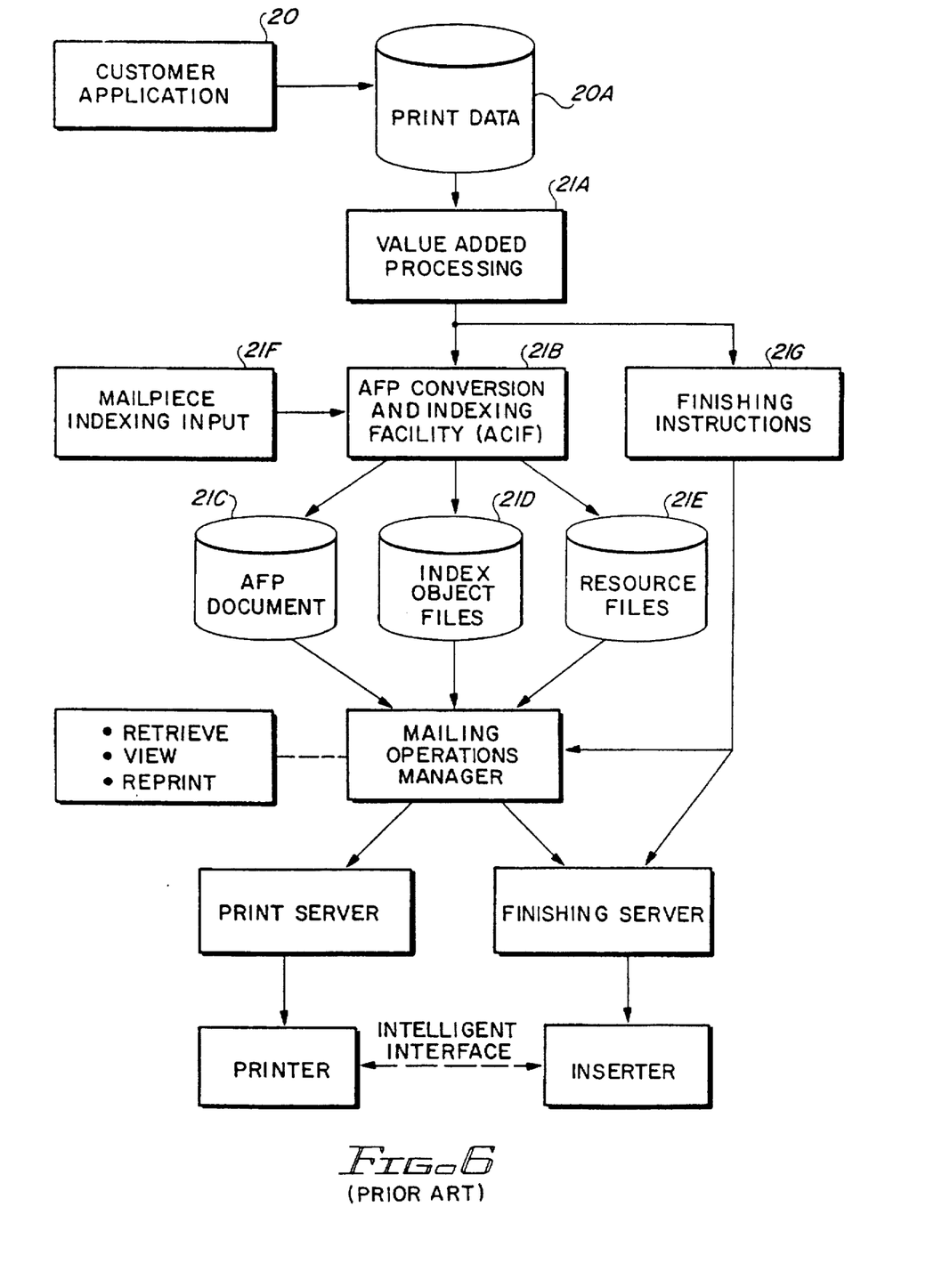
FIG. 6 shows an interface model of the system of FIG. 5 with many of the software and hardware components that must work together to automate the production of the individual mail pieces.

FIG. 6 shows a generic interface model for the large mail room system of FIG. 5. Such a system is a coordinated set of hardware and software components and interfaces that work together to automate the output processes associated with high volume printing, finishing and delivery of individual mail pieces. Work begins in the data processing portion of the system with applications 20 that generate print data 20A. In many instances these applications are existing "legacy" applications on large mainframes that produce many types of large mailings such as, for example, the billing statements of utilities for customers. As shown in FIG. 6 the print data 20A from customer applications is further processed by value-add applications 21A and advanced function presentation (AFP) functions 21B that condition the data for printing and prepare object files 21C, D, and E for downstream operations.

In today's modern environment there are many tools available to assist in generating customized print output. Examples of value-add functions are programs which provide address verification, presorting of statements by their postal characteristics, programs 21G for building insertion instructions based on information contained in demographic and marketing databases and programs 21F for segmenting print data into manageable units of work.

Examples of advanced function presentation functions are services that convert line data into page data, build document index objects for locating individual groups of pages and building print files for reprint, viewing and archiving services for storing and retrieving the manageable printing units of work.

Host value-add programs and AFP services are designed to be application independent so that they do not require changes in the customer's print producing applications in order to perform their function. Once the VA and AFP process is complete the print files are scheduled for printing. Control information for the insertion process is separately sent to the finishing server when the finishing hardware is not in line in the print path. Bar code or optical recognition marks on the paper are used by the finishing server to correlate the finishing instructions for a print job with individual mail pieces to be assembled and packaged for postal delivery.

Figures 7, 8:
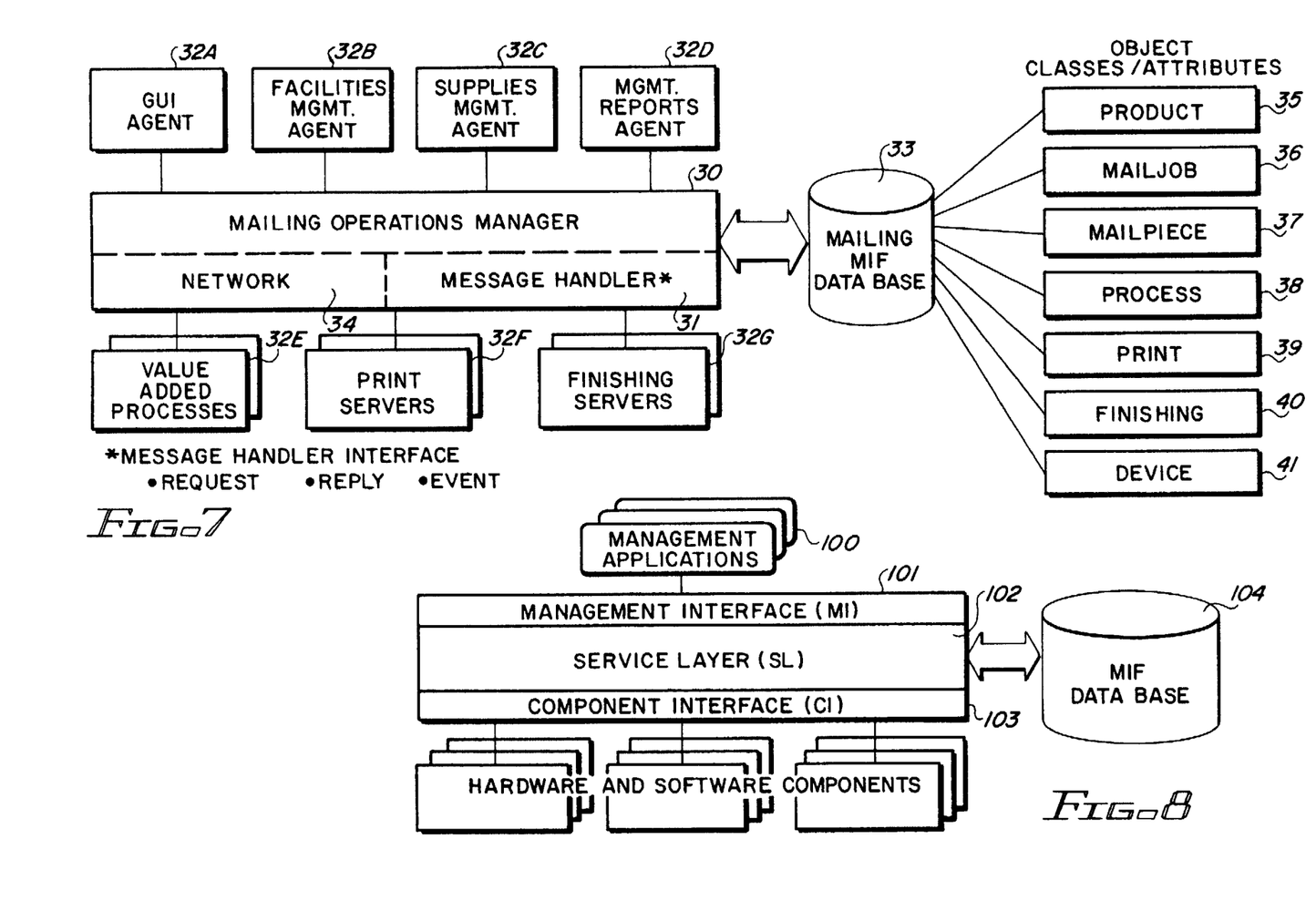
FIG. 7 shows a model of the mailing operations manager developed to control the large mail room operation by providing an object-oriented database into which all of the various hardware and software components can define themselves and report changes in status.
FIG. 8 shows a model of the "Desktop Management Interface" (DMI) developed to manage the hardware and software components of a desktop computer, regardless of variations in operating system software, application software or hardware components comprising the desktop computing system. The desktop model of FIG. 8 is extended herein to describe the network model of FIG. 7.

FIG. 7 shows a generic model of the system manager, mailing operations manager 30, which must provide a message handler interface 31 that is used by all of the various hardware and software processors 32A–G to define themselves to the system and report changes in status. Information about the processors 32A–G is maintained by the systems manager in a database called the Management Information Format (MIF) file 33. The system manager must also provide the request, reply, message interface 31 used by application agents to query status and obtain information about the products, mailing jobs and mailing pieces in progress over a network 34 providing client/server functions.

The system and models shown in FIGS. 5, 6 and 7 were developed by a council of users and vendors called LMO Systems Workgroup. That workgroup, comprised of research companies, is now known as the Data Management Task Force (DMTF) Finisher Workgroup, and was formed to identify key requirements of large mail room operations (LMO) and to explore the possibility of defining an open systems architecture standard for meeting them. This work resulted in demonstrating the capabilities of an integrated system at the "XPLOR" conference in November of 1993. The "Large Mailing Operations Standards Specification", Version 1.0, incorporated herein by reference, was published on Oct. 31, 1994, by the DMTF Finisher Workgroup and is available from Pennant Systems, Inc., Boulder, Colo. 80301-9191. It is the standard that has been developed by the workgroup to manage hardware and software processors in the large mail room operations systems environment.

The demand for standards is fostered by the need for selecting an architecture base that is widely accepted, easy to implement and extendable to future requirements. Customers and vendors alike need to feel that their solutions and products are built on interfaces that are durable and can take advantage of emerging technologies. In the desired system, easy to understand graphical interfaces commonly used on desktop computers are important.

In looking for currently available open systems standards for modeling the functions required in the large mail room operations (LMO) environment, the LMO standards work group discovered that the standard base that most closely meets these requirements is the DeskTop Management Interface (DMI). The DMI standard is managed by a group of companies calling themselves the DeskTop Management Taskforce (DMTF) who published the DeskTop Management Interface Specification, Version 1.0 on Apr. 29, 1994, incorporated herein by reference. The publication may be obtained from any company who is a member of the taskforce including IBM Corporation, P.O. Box 1900, Boulder, Colo. 80301-9191.

Implementations of the DMI are available today or committed in OS2, Workplace OS, DOS and AIX. Other platforms are sure to follow. By building LMO objects and management protocols on the DMI, LMO standards may be established in a uniform manner across all of these platforms.

In the terminology of DMI, components are physical or logical entities on a system such as hardware, software or firmware. Components may come with the system or may be added to it. The code that carries out management actions for a particular component is known as "Component Instrumentation". FIG. 8 shows a generic model of the DMI.

A management application 100 is a program that initiates management requests. A management application uses the DeskTop Management Interface to perform management operations. The management application is exemplified by a program such as an application with a graphical user interface (GUI), an application program agent, or it may be a network management protocol agent that translates requests from a standard network management protocol such as SNMP or CMIP to the DMI and back again.

The service layer 102 coordinates access to component instrumentation and component provided data in the Management Information Format (MIF) database 104.

One may note the natural relationship of the DMI model shown in FIG. 8 with the LMO model shown in FIG. 7.

In the use of the DMI, component descriptions are defined in a language called the "Management Information Format" (MIF). Each component has an MIF file to describe its manageable characteristics. When a component is initially installed into the system, the MIF file for that component is added to the MIF database 104 for use by the service layer.

The component interface (CI) 103 is used by component vendors to describe access to management information and to enable a component to be managed. The CI shields vendors from the complexity of encoding styles and management registration information. Vendors do not need to learn the details of emerging management protocols.

The management interface (MI) 101 is used by applications that wish to manage components. The MI shields management application vendors from understanding the different mechanisms used to obtain management information from elements within the system.

The CI and MI are data interfaces as opposed to procedural interfaces. Data blocks are used as the format for data transfer—not parameters to a function call. The behavioral mechanics of the CI and MI make up the data transfer mechanism.

The service layer (SL) 102 is an active, resident piece of code running on a computer system that mediates between the MI and the CI and provides access to the database 104.

It should be noted that the DeskTop Management Task Force which developed the DMI did so to close the gap between management software and the system components that require management on a desktop computer. Within a computer system, the DMI has been designed to be independent of any specific computer or operating system. It is designed to be independent of any specific management protocol. It is designed to be independent of a network but it is designed to be mappable to existing management protocols, e.g., CMIP or SNMP. Basically, however, the DMI is designed for a single desktop computer where components are physical or logical entities on the computer system, such as disk drives and word processors. The DMI does not address or specify a protocol for management over a network but the prospect of managing several desktop computers within a network was considered by the DeskTop Management Task Force. The LMO standards work group has greatly extended the vision of the DMI by applying it to a network which not only includes desktop computers, but also includes complex machinery, such as document finishers and inserters. Moreover, the vision of the DMI is extended to include large mainframe host equipment and processes running thereon. The LMO system calls for defining the manageable characteristics of complex machinery and the manageable characteristics of mainframes and mainframe processes in an MIF database so that these characteristics can be managed from a workstation or desktop computer or any GUI on the network.

SUMMARY OF THE RELATED INVENTIONS

In implementing the large mail room system manager model on the DMI interface several problems were revealed which resulted in the inventions which are the subject of this patent application and the related patent applications named above.

In a large mail room operation there are many hardware and software processes to be managed and many management applications requiring access and control over the manageable data. Most of these processes and management applications are located on, or controlled by computing systems other than the particular computing system containing the DMI and the MIF database. To satisfy the networking requirements of the large mail room operation, the DMI model needed to be extended to provide for client/server communication in a manner that preserved the syntax and semantics of the DMI standard, while enabling the service layer to continue to dynamically coordinate and arbitrate requests from the management applications to the specified component instrumentations. Related patent application Ser. No. 08/334,948 provides a solution to this problem. It was observed that because the nature of the service layer is to provide support that handles run time management of both the management interface and the component interface, simple request/reply, client/server protocols would not suffice. To solve this problem has required the invention of a network client protocol capable of handling three-way dialogues between clients, servers and instrumented components all residing on different nodes. To do that the client interface was established by supporting all of the functions of the MI and the CI at each of the required client platforms. This is accomplished by porting DMI function calls to those platforms and implementing them on a "Remote Procedure Call" (RPC) base using Transmission Control Protocol/Internet Protocol (TCP/IP) as the transport carrier. The underlying RPC support is handled by the client interface code and is transparent to the DMI programmer. The invention enables operation in a consistent manner across a variety of operating systems, hardware platforms and different architectures. In addition, it is capable of allowing a client implemented on one architecture to inter-operate with a server implemented on another. The invention preserves the semantics and syntax of the MI and CI, while enabling data transfer mechanisms to and from client, servers and instrumented components, all of which may reside in different nodes in the network.

A problem faced in implementing the system manager models involved the many legacy applications running on mainframe platforms to prepare print jobs. In a large mail room operation there are many applications and value-add processes running on mainframe computers that need to be tracked and managed as an integral part of the mailing operation. Examples of these are programs which generate print output, like bills for mailing; programs which pre-sort customer's statements by postal characteristics; value-add processes that add bar code data to print images and build finishing instructions for individual mail pieces; and programs that further condition data objects for archiving, printing and insertion process steps in the workflow path of mailing. In many instances, these applications are not capable of generating direct calls to set values and report status in the DMI databases so that they can be managed using the standard management interfaces defined by the DMI. Related patent application Ser. No. 08/334,585 provides a solution to this problem. Because the characteristics of host programming can vary from one host system to another, it was determined that a data stream solution would be preferred to a procedure based program call solution. In the invention, agent programs to set control parameters in the DMI database for use by management applications are provided, so that tags inserted in the data stream can be fielded by the agent programs and converted into the proper format for setting control parameters in the DMI database. The basic building block of the invention is a self-defining "Tag Logical Element" (TLE) structured field which was already available in the Advanced Function Printing architecture. The TLE structured field in turn is comprised of two self-defining fields called triplets. One triplet identifies the TLE as a tag for setting DMI values. The other triplet contains the parameters used in setting specific attribute values in the DMI database. An instrumented agent is provided as an exit program in the host to split away the TLEs and send them to an agent program in the DMI server to interpret the tags and generate the DMI commands. The tags may be placed in the print stream by the applications themselves or by value-added processes at the host. Once the invention had been generated for application programs at the host, it became apparent that any program which generates TLE tags could submit those tags directly to the program agent in the DMI server and establish values in the MIF without needing to utilize C-language programming to interface with the MI. In this manner, management applications at any node in the system, not just a host, can utilize the simple TLE mechanism to set attribute values.

A problem addressed by the inventors relates to the need for various management applications at various nodes to access the same data in the database for different functions in different report formats for different purposes. For example, a supply low event attribute may require the attention of a machine operator on one node. It may trigger an inventory transaction at a second node and it may cause rescheduling of mail jobs to match work with available supplies from a third node. Each of these functions and others may be performed by different users at different nodes in the LMO installation. Object-oriented modeling of the large mail room environment enables large volumes of attribute data associated with each step in the mailing process to be captured and maintained in the database. Attributes about products, mail jobs, insert jobs, printers, inserters, supplies, machine set-ups and finishing instructions may all be found in the object model of the various components of the system. The problem of accessing all of that data in various ways is compounded by the need to allow the object database to grow over time and report formats to change without requiring reprogramming to access new functions. Another difficult requirement is to allow customization of reports on an attribute by attribute basis for different users of the system. Related patent application Ser. No. 08/334,810 provides a solution to this problem. To meet these requirements a table-driven technique has been invented that recognizes the generic structure of components, groups and attributes in any MIF file and defines the mapping of any attribute value in any component to any column in any window on the display in any order. The mapping of a specific collection of attributes to a particular window is called a report. Multiple reports may be associated with a particular user who is authorized to view and interact with the data to accomplish a task in the LMO system. The report definitions supported by this invention enable each attribute in a report to be controlled or monitored individually. The control functions provided include the ability to add additional controls as they become required and is provided for by the report definition structure.

SUMMARY OF THE INVENTION

A problem confronting the inventors was to find an answer to common workflow-related questions, such as, where is a particular mail piece? In a large workflow-oriented system environment, like the environment for large mail room operations, there are a number of process steps that must be performed on a named unit of work, such as a mail piece, to answer such a query. Each process step is a manageable component with its own characteristics, its own processing states and a status that may be modeled and managed in the LMO system. Object-oriented models of mail jobs are best represented by tables of transactions for each of the many hardware and software process steps required in the mailing. Since a single mailing may have upwards of one million mail pieces, and a given LMO system may have multiple mailings active at the same time, rapid access in update of transaction entries in these tables is both a requirement and a challenge. Existing table management protocols in object-oriented environments, such as SNMP and CMIP, are not adequate to meet the volume and performance requirements of an LMO system. Database systems on the other hand, provide efficient query and reply access to large databases, but fail to provide modeling and reuse capabilities required in LMO systems. The invention described in this patent application is the provision of instrumentation logic to efficiently develop all of the many DMI commands that are necessary to answer a management query such as "Where is the mail piece?" The invention shields the user from the need to understand the details of the MIF file and develop himself all of the necessary commands to obtain the data. The invention has also been carried further in that speed in answering the query is improved by providing instrumentation logic to map object-oriented protocols to efficient data management protocols to provide direct keyed access to mail job data located in a specially created database utilizing available database products such as DB2. The novel techniques herein provide instrumenting groups that are used for passing parameters and returning values for complex queries while using the standard facilities of existing management protocols. An example of the usefulness of the invention in the LMO environment is, for example, to track mail piece data. To do that, a group may be defined with attributes that are set to specify the mail piece and mail job identifiers. These attributes are input arguments for the search. After setting the search attributes, the management application issues a DMI "GET" command for the current value of the location of the attribute of the group. The DMI service layer responds by invoking the inventive instrumentation for the tracking component. The instrumented code issues all necessary commands to query each active process, locate the mail piece and return the location value. The instrumented code itself is a management application that uses the standard DMI interface. In other object management environments, such as SNMP, access may be provided through agent programs. The selection of the underlying database manager may vary from implementation to implementation and is transparent to the management application requesting the access.

DESCRIPTION OF THE DRAWING

The invention is set forth in detail below with reference to the accompanying drawing a brief description of which follows.

DETAILED DESCRIPTION OF THE INVENTION

When reference is made to the drawing, like numerals indicate like parts and structural features in the various figures.

FIG. 7 is a model of the systems manager and shows various objects for the object-oriented database 33 which have been defined by the LMO standards work group. These are various object classes which were considered important in managing the large mail room operation. Object class 35 is the product object which describes the name and the attributes of a mailing, for example, a product may be a mailing of bills. The mail job object class 36 is an object which identifies a manageable segment of the total product. For example, a mail job may be two thousand accounts within the total billing product.

The next object class is the mail piece object 37 which describes a specific set of pages that go into a particular envelope, for example, that set of pages that go into making up one particular bill to one particular customer.

The process object 38 contains a description of the steps that a mail piece must go through for it to be created, printed and mailed.

The print object class 39 will include data files for the various devices in the system that put marks on paper, for example, an IBM 3900 printer.

The finishing object 40 contains MIF database objects which describe the attributes of those devices that do the processing on the finishing line. For example, the manageable attributes of an inserter machine or a sorter or a document feeder or a franking machine would be the type of object found under this object class.

The device object class 41 is for other equipment which may be used in one of the processes interacting on the mail piece. For example, this object class would include a database on color imprinters.

Also in FIG. 7 various so-called agent programs 32A–32D are illustrated. A facilities management agent 32B is a program that would be developed by the owner of a mail room operation to manage the particular facilities included within that operation. The supplies management agent 32C is a program which would be developed and supplied by the owner of the large mail room operation to implement the management of supplies needed within that operation, for example, postage, toner for printing machines, paper, etc. The management reports agent 32D reflects those various programs which would be developed by the owner of a large mail room operation to obtain the particular type of management information that is needed from the database 33. For example, a management report agent might be developed to obtain information relating to the scheduling of mail jobs within the entire operation, so that for example, if one printer line is down, the mail job may be scheduled into the workflow for another printer line. In addition to these agents, other agents may be developed for a particular installation. All of these agents may operate from the same node or from different nodes on the network but it is envisioned that each of these agents will be located in the most advantageous location within the operation. All desktop computers will be provided with the GUI agent 32A to establish the interface for all other agents to the mailing operations manager 30.

The GUI agent is not supplied by the owner of the large mail room operation, but rather is supplied with the systems manager to provide a generalized interface for all GUI nodes.

In implementing the DMI standards, management information files (MIF) must be created in adherence with the DMI format. Files created in that format describe components which have attributes that have values and whose attributes can be assembled into groups.

A DMI component is any hardware or software device that can be connected to a computer system. In the LMO environment, this definition is extended to include such things as printers, inserters, status collectors, and various pre- and post-processing mechanisms.

An attribute is a characteristic or function or feature of a device, specifically a relevant and manageable characteristic. An attribute is a feature or function that a device manufacturer defines for expressing data values about the attribute. Applications systems used to monitor and control the device utilize attributes to manage it. An example of an attribute is the supplies that a printer uses.

A group is a "group of attributes". Attributes are assembled into groups based on their similarity of function or purpose. Examples of groups include such things as the input characteristics of printers or their output characteristics.

Attributes of devices have values attached to them. Some of these values are static values such as the name of the manufacturer of a printer, while other values are dynamic such as the number of pages that a printer has printed since it was installed.

MIF files are files describing components and their attributes. Each device manufacturer provides an MIF file that describes the characteristics of the device that can be managed. The MIF file is installed into the database of the system. The device makes itself known to the system through the MIF database.

Note that the system manager expands the DMI concept of a "component" to include not only hardware and software devices but also mail jobs and mail pieces in products being handled in the large mail room environment. Utilizing files developed in the MIF format, the system manager provides an interface to handle messages from devices to computer systems to create and update files about mail jobs and mail pieces. The system manager also provides interfaces so that users can query device status and obtain information about the various products, mailing jobs and mail pieces flowing through the system.

A third set of standards with which the system manager is compliant is the Advanced Function Print Data Stream (AFPDS) standard. This standard is described in "Mixed Object Document Content Architecture Reference," Document Number SC31-6802-02, Third Edition, June 1993, IBM Corporation, Department 588, P.O. Box 1900, Boulder, Colo. 80301-9191, USA, and is incorporated herein by reference. This standard includes a data stream format that supports graphics, text, barcode and resources such as fonts, overlays, page segments, form definitions and page definitions. The reference describes data stream tagging, page 140 et seq. As more fully described in related patent application Ser. No. 08/334,584, data stream tagging is used to identify individual mail pieces and to track them through the printing and inserting process. Tagging product data streams allows a break up of a data file into logical documents, each identifying a particular mail piece or recipient. Such tagging allows not only the tracking of mail pieces through the printing and inserting process, but also allows logical documents like mail pieces to be retrieved, viewed and archived.

In creating the system, it is important that devices of all kinds from different vendors should be able to be connected to the mailing system without requiring modifications. In addition, the system must be extensible, that is, it should be possible to add services, commands and actions without requiring redesign of the system. Also, the system should be based on a client/server model to take advantage of the versatility afforded by networks. The system should use graphical user interface technology. An additional requirement of the system is that it should be portable across different operating systems and types of computing machines. Finally, the system should be configurable, that is, users should be able to tailor the data in the system to their own management requirements. The LMO systems work group has provided a standard to meet all of these requirements.

Each component, which may be a device or mail job that is added to or installed in the system, must have an accompanying management information format (MIF) file to describe the manageable aspects of the component. By adding the MIF file to the database, the component is made known to the system and thereby is made available for responding to management commands. Vendors of devices who wish to be compliant with the DMI format must supply MIF files for their devices and installation programs to present the MIF file to the database through the service layer.

In the database, attributes may be a single valued entry or they may be group attributes defining a table or array of related attributes and their values. An example of a group attribute that defines a table is "printer supplies". Since there may be several different supply types such as paper, toner, fuser oil, etc., each with different attribute values, the attribute "printer supply" points to a table or array of supply types and their attributes, rather than to a single value. Whenever the various attributes in a group define one or more rows in a table, a key is needed to define the attribute IDs that are used as indices to the table. By use of the key, the particular row and attribute in the table is found.

The DMI recognizes that some attributes represent static information, for example, the name of a vendor, and also include dynamic information, for example, the amount of paper on the unwinding machine. To obtain static information the request for an attribute value is fielded by the service layer and reference is made to the MIF database to answer the query. The same approach may be used for dynamic values. However, the database attribute value may not have been updated for some time. To obtain current values of dynamically changing attributes, the DMI makes available "component instrumentation" code for acquiring the attribute value from its source. When component instrumentation is used, the service layer branches to the component instrumentation to obtain the latest value for that attribute.

The description of each component in the MIF database is established according to a standard definition and utilizes clear text. The definition is of a component with groups and the attributes of those groups. The MIF format provides a keyable data structure. Once the description is in the system, the service layer enables the traversing of these different objects to monitor the values of the attributes in order to provide the data from which reports can be generated. A clear text file is one in which there is no particular formatting other than perhaps a delimiter, such as carriage return. Consequently, it is easily keyable information which may be described in any human language, English, German or whatever and translated into an ASCII database for use by the computer.

The management interface (MI) interfaces with the management applications to provide access to the data base for management functions. The command "DMIGET" would be used primarily by the management applications to request information through the service layer for a particular component. The service layer acknowledges receipt of the message and issues as many requests to different component instrumentations as necessary to satisfy the management request. If the initial request was for static information, the service layer would find that information in the database. If however, the request was for the current state of a device, the service layer would act as a mediator between the requestor and the component and would address component instrumentation through the component interface (CI) to obtain the current status of the device. Once ascertained, the current state would be passed on to the management requestor through the management interface. The command "DMISET" might be used by the hardware and software components through the component interface (CI) or by management applications through the MI to set information in the data field. All of the DMI commands and the control blocks for those commands are set out in the DMI specification which has been incorporated herein by reference.

The current invention provides two major advantages for users of complex object-oriented database systems, such as are used in the large mailroom operation environment. An object-oriented database is needed because of the capability of creating new objects as components are added to the system and the ease of changing the attributes of objects once they are created. While the object-oriented system has advantages that are needed, it also presents the problem of accessing data located in a large and complex database. The invention herein is designed to shield the user of the system from the need to understand the complexity of the object-oriented database, thereby providing a significant advantage to the system user. The invention provides for accessing data by a management application through instrumentation which translates one DMI command into the many, many DMI commands that might be needed to obtain the data to answer the management application.

Currently existing object-oriented database management protocols are slow in the large and complex environment such as is present for a large mailroom operation. To speed the obtainment of the needed data, the invention also envisions the creation of a special database to contain the needed information to answer a particular query. That special database may be organized and use the protocol of existing available database products such as DB2 to retrieve the needed information in a fast and efficient manner. The retrieved information is passed back to the instrumented code and from the instrumentation to the service layer, and from there to the requesting management application. Thus a significant advantage is provided in the speed by which data is retrieved to answer a simple-looking but complex query.

Figure 9:
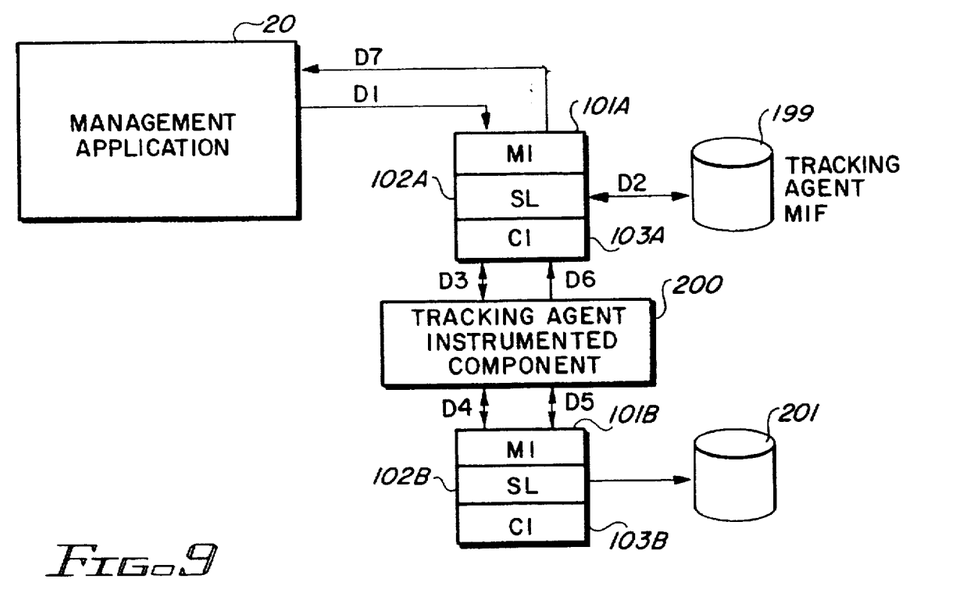
FIG. 9 shows data flow for obtaining access to the database of FIG. 7 through the DMI of FIG. 8 by utilizing special instrumentation for a complex query.

FIG. 9 shows the data flow for obtaining the answer to the query, "Where is the current location of a particular mail piece?" A management application 20 issues the search argument with the DMI command DMI "GET". The search argument is as follows: component=tracking agent; group= tracking mail piece; attribute=mail piece location; key= product name, product instance qualifier, and mail piece ID. The product name may be, for example "Billing", and the product instance qualifier may be, for example, "January".

The process involves the issuance of the initial search request by the management application 20 through the management interface 101A to the service layer 102B. The service layer 102B utilizes the component, group, attribute and key information to access the tracking agent component MIF file 199. That file indicates that an instrumented component is designated. The service layer then turns to the tracking agent instrumented component 200 through the component interface 103A. The tracking agent instrumented component 200 utilizes the attributes originally passed from the management application 20 to address the MIF file 201. In this instance the instrumented component 200 is like a management application and it utilizes the management interface 101B and the service layer 102B to address the MIF file 201 to obtain the mail job component. Note that in setting the component =mail job, the tracking agent utilizes the product name passed as a key by the management application 20.

The service layer 102B obtains the attribute value for the print job name from the MIF file 201 and returns that value to the tracking agent instrumented component 200. The tracking agent then uses that result to form a new request where component=mail job; group=print job table; and attribute=current status; where the keys=product name, product instance qualifier, and print job name. This is, therefore, a second DMI "GET" issued by the tracking agent. Once again, the management interface 101B is utilized to provide the command to the service layer 102B which interfaces with the mail job MIF 201 to obtain the current status of the mail piece. That value is passed back through the service layer and the management interface to the tracking agent instrumented component 200. The tracking agent 200 returns the result to the service layer 102A through the component interface 103A. The service layer utilizes the management interface 101A to return the result to the management application 20.

This simple example shows that the management application originally issued one DMI "GET", but the result was to pass the request to instrumented code which utilized two DMI "GET" commands to obtain the requested information. The instrumented code utilized the results of the first DMI "GET" to retrieve the print job name and utilized that data to obtain the current location of the mail piece through the second DMI "GET". This simple example shows that the initial request was more complex than the management application 20 needed to realize.

It should be noted that the management interface 101A and the management interface 101B are one and the same. Similarly, service layer 102A and 102B are one and the same, and component interface 103A and 103B are one and the same. The illustration in FIG. 9 separates these components in order to provide a simpler view of the data flow.

The following is a definition of the management information file created to interface with the tracking agent to answer the particular management request illustrated in FIG. 9, i.e., locate a mail piece.

Statement 1

```
start component
    name = "Tracking Agent"
    start path
        name = "DirectInterface"
        os2 = direct-interface
    end path
    .
    .
    .
    start group
        name = "Track Mailpiece"
        id = 2
        class = "LMO Standards Work Group|Direct Mailpiece XReference Table|1.0
        description = "This table provides a mapping of Mailpiece"
            "Identifiers to Process Sequence Identifiers and"
            "Print Job Names to enable reprint and tracking."
        key = 1,2,3
        start attribute
            name = "Product Name"
            id = 1
            description = "The name of the product to which this mailpiece"
                "entry applies."
            access = read-write
            storage = specific
            type = displaystring(45)
            value = * "DirectInterface"
        end attribute
        start attribute
            name = "Product Instance qualifier"
            id = 2
            description = "The Instance Qualifier for the name of the product"
                "associated with this mailpiece entry. The"
                "The combination of Product Name and Product"
                "Instance Qualifier is required to insure unique"
                "key access to table entries when multiple instances"
                "of a product are active in the system at the same"
                "Time."
            access = read-write
            storage = specific
            type = displaystring(45)
            value = * "DirectInterface."
        end attribute
        start attribute
```

-continued

Statement 1

```
        name = "Mailpiece Identifier"
        id = 3
        description = "The name of the mailpiece assigned by the"
            "application; for example, account number."
            access = read-write
            storage = specific
            type = displaystring(45)
            value = * "DirectInterface."
    end attribute
    start attribute
        name = "Mailpiece Location"
        id = 4
        description = "The name of the Print Job that contains the print"
            "data associated with this mailpiece entry."
            access = read-only
            storage = specific
            type = displaystring(45)
            value = * "DirectInterface"
        end attribute
    end group end component
```

Figure 10:
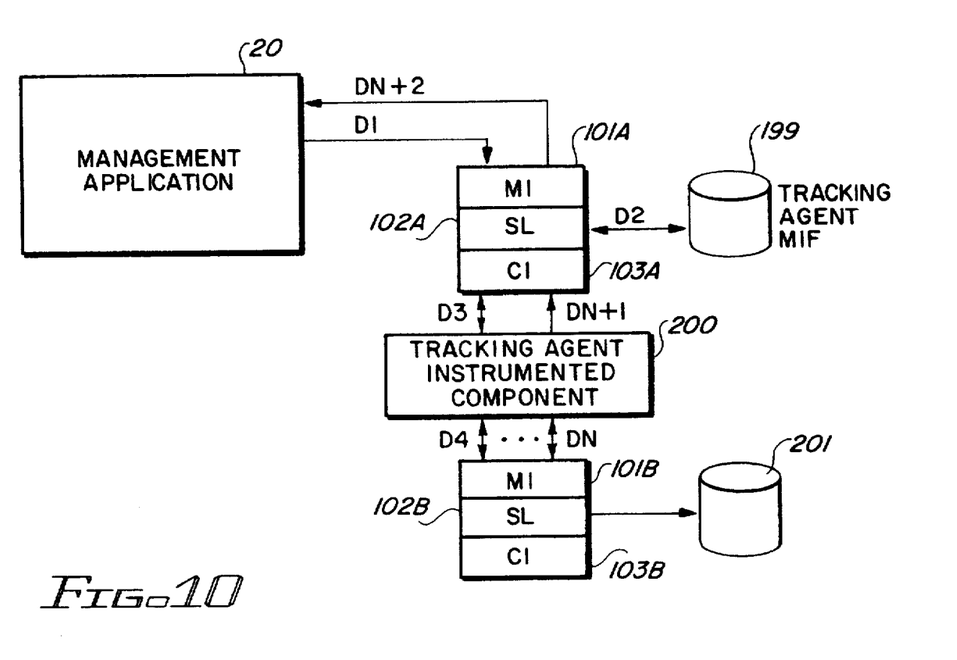
FIG. 10 shows data flow similar to FIG. 9 for a more complex query.

A somewhat more complicated example is illustrated in FIG. 10. In this instance the management application 20 desires to obtain a list of all the print jobs associated with a particular product. For example, suppose that a company named "Electric Utility" wishes to obtain a list of all of the mail jobs comprising the January billing. If that billing comprised 1,000,000 pieces of mail, and the total mailing was divided into mail jobs of 20,000 bills apiece, then there would be 50 mail jobs making up the total mailing. The example of FIG. 10 is to obtain a list of those 50 jobs.

The management application 20 issues a DMI "GET" call with the attribute "JOB LIST" naming the component as the "TRACKING AGENT" and the group as "LIST JOBS". The management application would supply as keys the product name "billing" and the instance qualifier "January". When the service layer 102A receives the request, it interfaces with the tracking agent MIF file 199, where it ascertains that the tracking agent is an instrumented component. The service layer makes use of the component interface 103A to address the tracking agent instrumented component 200. Upon receiving the request, tracking agent 200 addresses the mail job MIF file 201 through the management interface 101B. Again, in this example, management interface 101B is the same as management interface 101A, but for clarity in illustrating the data flow it is shown separately. Management interface 101B acts through service layer 102B to access the MIF file 201. The tracking agent instrumentation 200 issues successive "GET ROW" commands with component=mail job and group=print job table. Tracking agent 200 addresses the MIF file through the management interface and the service layer. With this particular DMI command, a row of the print job table is returned to the tracking agent 200 to enable the tracking agent code to compare the key values of the product name and instance qualifier with the corresponding attributes in the result of the "GET ROW" command. If they match, the row represents a print job name to be saved. If they do not match, nothing is saved. In either event, the step of issuing another "GET ROW" command is repeated, until there are no more rows in the table. Once the total table has been inspected, the names of all of the print jobs to satisfy the request will have been obtained. The result is then passed back to the service layer through the component interface 103A and the service layer returns the result through the management interface to the management application 20.

In this example, the management application issued one "GET" command, while the tracking agent instrumented component issued a large number of successive "GET ROW" commands in order to obtain the result. The number of "GET ROW" commands issued equals the 50 names obtained for the January billing plus all of those print job names in the table which did not match the keys for a January billing.

The following is a definition of the management information file created to satisfy this particular complex query to list the jobs in a particular mailing product.

Statement 2

```
start component
    name = "Tracking Agent"
start path
    name = "DirectInterface"
    OS2 = direct-interface
end path
        .
        .
start group
    name = "List Jobs"
    id = 2
```

-continued

Statement 2

```
class = "LMO Standards Work Group I Direct Mailpiece XReference Table II.0
description = "This table provides a mapping of Mailpiece"
             "Identifiers to Process Sequence Indentifiers and"
             "Print Job Names to enable reprint and tracking."
key = 1,2
start attribute
        name = "Product Name"
        id = 1
        description = "The name of the product to which this mailpiece entry
                    applies"
        access = read-write
        storage = specific
        type = displaystring(45)
        value = * "DirectInterface"
end attribute
start attribute
        name = "Product Instance Qualifier"
        id = 2
        description = "The Instance Qualifier for the name of the product"
                    "Associated with this mailpiece entry. The"
                    "The combination of Product Name and Product"
                    "Instance Qualifier is required to insure unique"
                    "key access to table entries when multiple instances"
                    "of a product are active in the system at the same"
                    "Time."
        access = read-write
        storage = specific
        type = displaystring(45)
        value = * "DirectInterface"
end attribute
start attribute
        name = "Job List"
        id = 3
        description = "The name of the Print Job that contains the print"
                    "data associated with this mailpiece entry."
        access = read-only
        storage = specific
        type = displaystring(512)
        value = * "DirectInterface"
end attribute
end group
  .
  .
  .
end component
```

Figure 11:
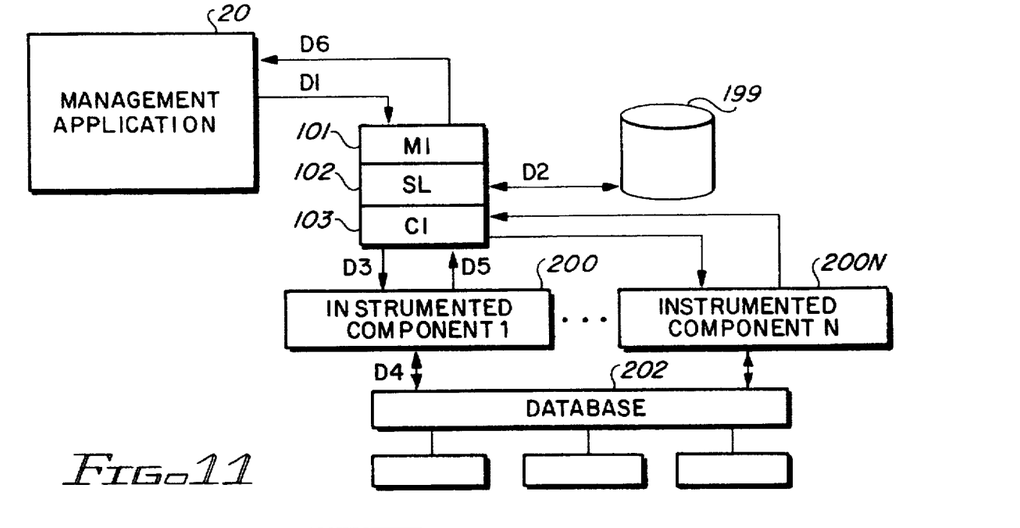
FIG. 11 illustrates a performance improvement for the query of FIG. 10 by providing a special database to interface with the special instrumentation.
Figure 12:
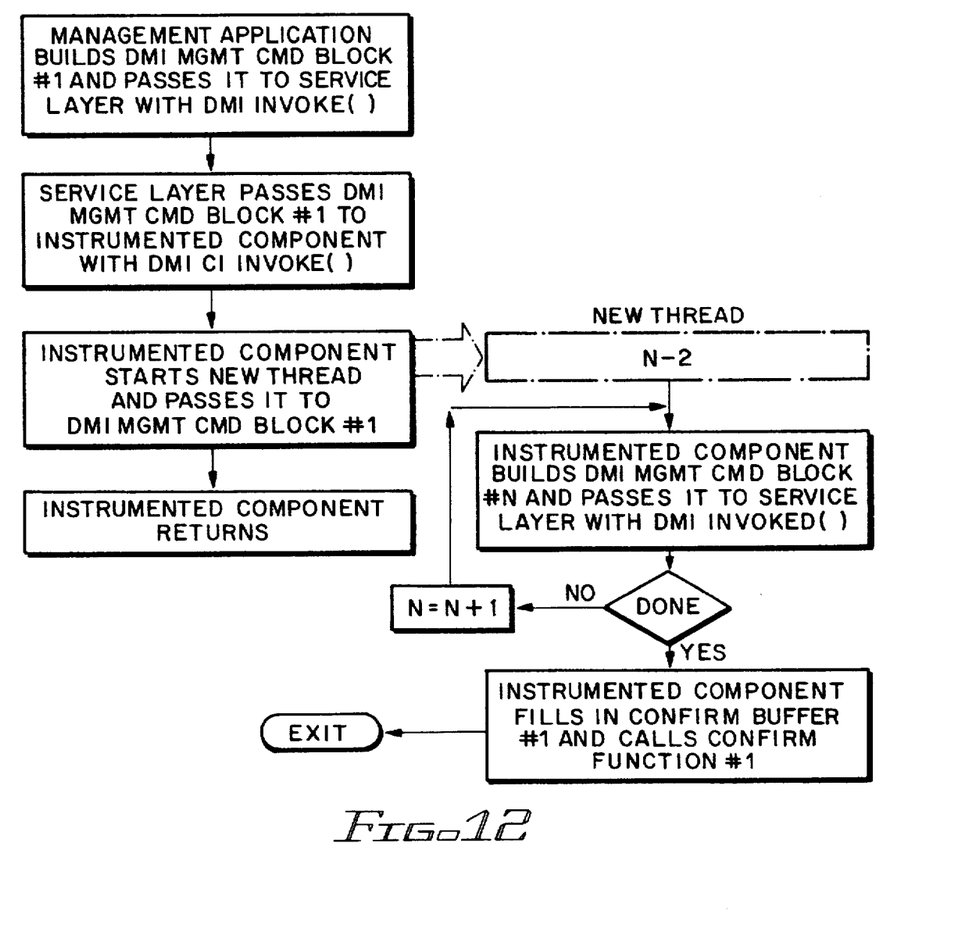
FIG. 12 shows the process steps through which the instrumentation addresses the DMI database to answer a computer query.

FIG. 11 illustrates a performance improvement for the example shown in FIG. 10. Note that in FIG. 10 at least 50 "GET ROW" commands had to be issued, since there were 50 mail jobs making up the answer to the request. Actually, many more than 50 "GET ROW" commands would have been issued since several of the print jobs would not have been associated with the product name and instance qualifier. To improve the performance of this type of request, the instrumented component 200 may interface with a special database 202 organized according to a chosen database protocol such as DB2 in order to derive the information.

In this case, the management application 20 issues a request as previously set forth. The service layer 102 interfaces with the tracking agent MIF file 199 and finds that the query must be answered through an instrumented component 200. Service layer 102 passes the request to the instrumented component 200 which issues a query in the protocol of database 202 in order to obtain the result. Only one such query need be issued by the instrumented component in this example. Upon receiving the response, the instrumented component 200 would build the list in the format required and send it back through the component interface, the service layer, and the management interface to the management application 20.

Additional instrumented components 200N are shown in FIG. 11 to illustrate that more than one such component can address the database 202 to speedily answer additional complex queries.

Thus an invention has been described which significantly reduces the number of function calls that a management application makes to the DMI interface in order to obtain an answer to a complex query. Management application might not ascertain that it is asking a complex query since the single function call is directed to an instrumented component which issues all of the function calls needed to obtain the information requested by the management application and then sends that information back. The invention further streamlines the response activity by addressing a special database for rapid access of the data through a database query approach. In that manner, the invention provides rapid response to complex queries over the DMI.

While the invention has been described above with respect to a specific embodiment it will be understood by those skilled in the art that various changes in form and detail may be made therein without departing from the spirit and scope of the invention. Again, changes in form and detail do not depart from the spirit and scope of the invention which receives definition in the following claims.

What is claimed:

1. A method of obtaining data requested by a management application from a computing system in which a Desktop Management Interface (DMI) system is resident together with an object-oriented database, said DMI for managing hardware and software components, said DMI providing for component instrumentation to obtain data from components without searching said object-oriented database, said method comprising the steps of:

provi­ding a management interface within said DMI to receive a request for data from said management application;

providing a service layer within said DMI to issue a DMI function call to address said object-oriented database with said request;

providing tracking agent instrumentation for obtaining data needed for a particular request;

providing a designation of said tracking agent instrumentation in said object-oriented database so that said request is returned to said service layer for passing the particular request to said tracking agent instrumentation;

providing a component interface within said DMI to pass said request to said tracking agent instrumentation as though it were component instrumentation and to receive data developed by said database instrumentation; and providing said management interface within said DMI for passing said data developed by said tracking agent instrumentation to said management application.

2. The method of claim 1 wherein said tracking agent instrumentation generates a plurality of DMI commands to obtain the data needed from said object-oriented database to respond to the particular request.

3. The method of claim 1 further including the steps of:

providing a non-object oriented database duplicating data in the object-oriented database needed to respond to said particular request; and providing said database instrumentation for addressing said non-object oriented tracking agent to obtain the data needed to respond to the particular request.

4. In a large mailroom operation for preparing thousands of mailings comprised of various documents, and wherein said mailings are prepared by machines which print the documents, compiles them and inserts them into properly addressed envelopes, each mailing is divided into a number of separate mail jobs each with a number of individual mail pieces, data relating to each mail job is placed into an object-oriented database as each mail job is processed, and wherein a number of process steps are performed on each mail piece, said object-oriented database including tables of transactions for each of the process steps so that reference to the database achieves an indication of the status of each mail piece, a machine-implemented method of obtaining data about said mailing said method utilizing the Desktop Management Interface (DMI), comprising the steps of:

providing tracking agent instrumentation for obtaining data needed to respond to a mail piece status request;

providing a designation of said tracking agent instrumentation in said object-oriented database so that said DMI passes the mail piece status request to said tracking agent instrumentation; and providing said tracking base instrumentation for returning the data needed to respond to the request to said DMI.

5. The method of claim 4 wherein said tracking agent instrumentation generates a plurality of DMI commands to obtain the data needed to respond to the status request wherein the need to generate a plurality of DMI commands to obtain the data is transparent to the requestor.

6. The method of claim 4 further including the steps of:

providing a non-object oriented database duplicating the data in the object-oriented database needed to respond to the status request; and providing said tracking agent instrumentation for addressing said non-object oriented database to obtain the data needed to respond to the status request.

7. A system for responding to a request for data in a network with nodes having a variety of components such as controllers for complex machinery, complex computing equipment, complex software and desktop computing equipment, said network utilizing the facilities of the Desktop Management Interface (DMI) to obtain data requested from a node on the network, said DMI located at a DMI node in said network, said DMI node having an object-oriented database for storing data, said system additionally providing for component instrumentation so that data can be obtained through said DMI node from said component instrumentation without searching said object-oriented database, said system comprising:

tracking agent instrumentation means for addressing the database;

management interface and service layer means within said DMI for receiving requests for data from any other node on said network and generating a DMI function call to the object-oriented database;

means for designating said tracking agent instrumentation means in said object-oriented database wherein a request for data involving said tracking agent instrumentation means is returned to said DMI;

component interface means within said DMI for addressing said request to said tracking agent instrumentation means;

said tracking agent instrumentation means for generating all commands needed to obtain data needed to respond to said request;

said component interface means within said DMI for receiving data in response to said request from said tracking agent instrumentation means; and said management interface means within said DMI for addressing said data in response to said request to the node from which said request was received.

8. The system of claim 7 wherein said tracking agent instrumentation means resides at said DMI node and generates a plurality of DMI commands to obtain data needed to respond to said request from said object-oriented database wherein the said method utilizing the Desktop Management Interface (DMI), transparent to the requesting node.

9. The system of claim 7 further including:

a non-object oriented database at said DMI node for quick response to a particular request; and wherein said database instrumentation resides at said DMI node and addresses said non-object oriented tracking agent to obtain data in response to said request.

* * * * *

UNITED STATES PATENT AND TRADEMARK OFFICE
CERTIFICATE OF CORRECTION

PATENT NO. : 5,546,577
DATED : August 13, 1996
INVENTOR(S) : Marlin, Knudson, Ruehle, Stuart, and Hughes, III.

It is certified that error appears in the above-indentified patent and that said Letters Patent is hereby corrected as shown below:

On the Title page
   Other Publications

Change "Shannoon Gray-Voigt;" to --Shannon Gray-Voigt,--

Change Patent Application "Ser. No. 08/618,113" to
          --Ser. No. 08/168,113--

In Claim 3
   Col. 21, line 36:   change "database" to --tracking agent--

In Claim 4
   Col. 21, line 61:   change "base" to --agent--

In Claim 8
   Col. 22, lines 53 and 54:   delete "said method utilizing the Desktop Management Interface (DMI)," and insert --need to generate a plurality of DMI commands to obtain the data is- Signed and Sealed this Third Day of June, 1997

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,546,577
DATED : August 13, 1996
INVENTOR(S) : Marlin, Knudson, Ruehle, Stuart, and Hughes III.

It is certified that error appears in the above-indentified patent and that said Letters Patent is hereby corrected as shown below:

In Claim 1
   Col. 21, line 23: change "database" to --tracking agent--

Signed and Sealed this

Eighth Day of July, 1997

Attest:

Attesting Officer

BRUCE LEHMAN

Commissioner of Patents and Trademarks